R. P. NICHOLS.
AUTOMOBILE LOCK.
APPLICATION FILED APR. 25, 1913.
1,126,262.
Patented Jan. 26, 1915.
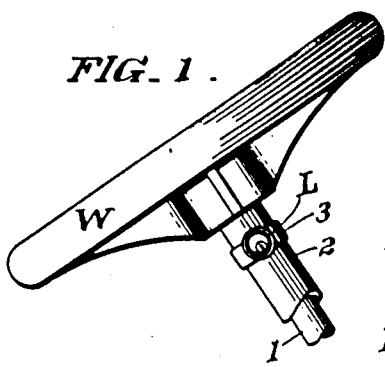
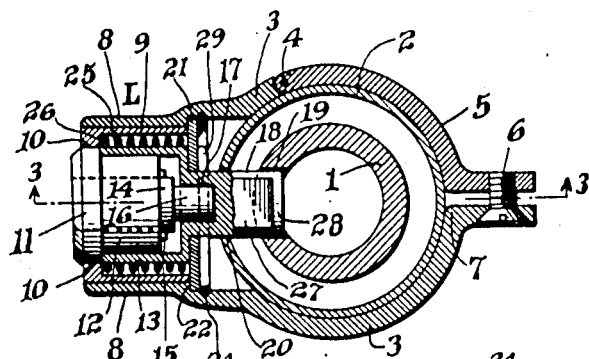
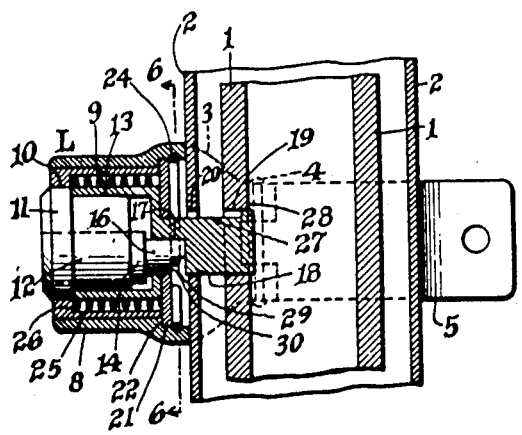
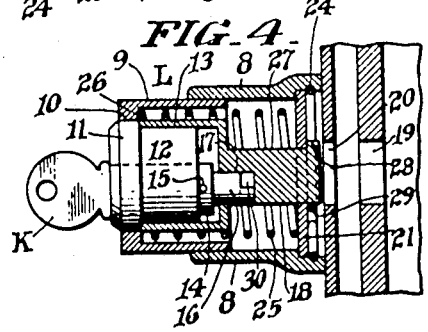
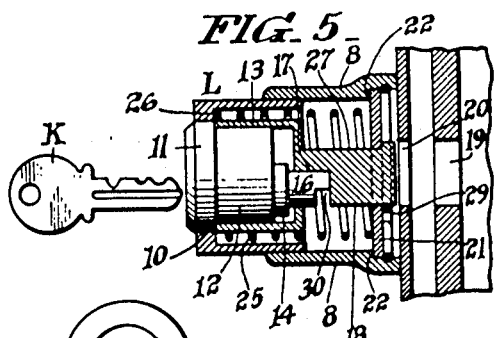
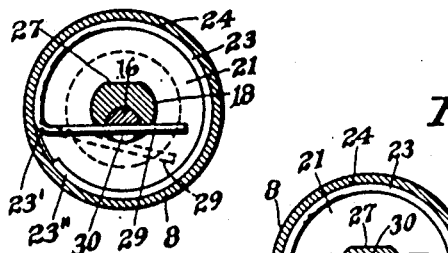
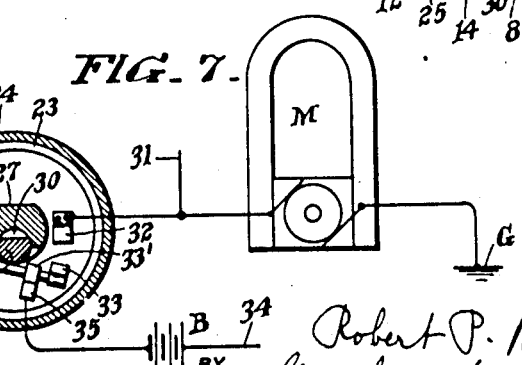
WITNESSES
Daniel Webster, Jr.
Nellie Evans
INVENTOR
Robert P. Nichols
Cornelius D. Ehret
BY his ATTORNEY

UNITED STATES PATENT OFFICE.

ROBERT P. NICHOLS, OF PHILADELPHIA, PENNSYLVANIA.

AUTOMOBILE-LOCK.

1,126,262.  Specification of Letters Patent.  Patented Jan. 26, 1915.

Application filed April 25, 1913. Serial No. 763,507.

*To all whom it may concern:*

Be it known that I, ROBERT P. NICHOLS, a citizen of the United States, residing in the city of Philadelphia and State of Pennsylvania, have invented certain new and useful Improvements in Automobile-Locks, of which the following is a specification.

My invention relates to means for locking relatively movable members in any desired or predetermined position; and my invention is particularly adaptable for use in locking the steering gear or any other suitable part of a vehicle, particularly of an automobile. And it is a further feature of my invention that the locking mechanism also controls an electric circuit, such as the electric ignition circuit of the motor or engine of an automobile.

My invention resides in the features hereinafter described and claimed.

For an illustration of one of the forms and one of the applications of my invention reference is to be had to the accompanying drawing, in which:

Figure 1 is a fragmentary view illustrating the application of my locking means to the steering mechanism of a vehicle, such as an automobile. Fig. 2 is a horizontal sectional view through the locking mechanism and locked parts, some parts shown in plan view. Fig. 3 is a vertical sectional view through the same parts taken on the line 3—3 of Fig. 2, and showing the parts locked together, as they are in Fig. 2. Fig. 4 is a vertical sectional view similar to Fig. 3 except that the parts are shown in the unlocked position, but before removal of key. Fig. 5 is a vertical sectional view similar to Fig. 4, the parts being in the unlocked position in which the key is or may be removed. Fig. 6 is a cross sectional view on the line 6—6 of Fig. 3. Fig. 7 shows a cross sectional view similar to Fig. 6 with the parts in the unlocked position, together with a diagrammatic view of electrical circuits controlled.

Referring to Fig. 1, W is a steering wheel secured to the steering post 1, within the stationary or non-rotatable tube 2; though it is to be understood that 2 may be the rotatable steering post and 1 the non-rotatable member.

At any suitable place upon the member 2, may be disposed the locking mechanism L of a character about to be described.

Embracing the member 2 is the circumferentially incomplete ring 3 having pivoted thereto at 4 the clamping member 5 into which is threaded the screw or bolt 6, thus clamping the ring 3 and member 5 tightly in place upon the member 2. The gap or opening in the ring 3 between the pivot 4 and the pivot 7 may be smaller than the outer diameter of the member 2 and the ring 3 sprung into the position shown. It is to be understood however that this gap may be made anything desired so long as the ring 3 may be properly clamped to the member 2. By this clamping arrangement my locking mechanism may be applied to the steering gear or other parts to be locked at any time. But it is to be understood that the ring 3 or other means for supporting the locking mechanism may be integral with or brazed or soldered to the member 2; as at the time the steering gear is manufactured.

The ring 3 supports the, preferably integral casing 8 within which is disposed for sliding longitudinal movement the shell or casing 9 within which is secured at 10, by soldering, screw threads, or otherwise, the head 11 of a lock, such as a Yale or other tumbler lock. The shell 12 of the lock is received within the shell 13 and must be secured to the latter. The barrel 14 of the lock is rotatable with respect to the head 11 and shell 12 and is prevented from withdrawal from the shell 12 by the transverse pin 15. The rotatable lock stud 16 projects into a cylindrical opening 17 in the locking bolt or member 18, the stud 16 being off center with respect to the center of the bolt or member 18 as will be seen from Fig. 6. The members 1 and 2, to be locked together, have holes 19 and 20 which, when brought into alinement or register with each other, allows the locking bolt or member 18 to pass through these holes, and thereby prevent relative movement between members 1 and 2.

The locking member 18 is integral with or may be secured to the shell 13. At the inner end of the shell 8, is a plate or disk 21 which may be of metal, or which may be made of insulating material, such as vulcanized fiber, when used for purposes described in connection with Fig. 7. The plate 21 is held against the shoulder 22 by the ring member 23 expanded into the circumferentially extending groove 24 in the shell member 8.

Disposed between the shells 9 and 13 is the helical spring 25 abutting against the plate 21 at its one end and against the outer flange 26 of the shell 9 at its other end.

The disk 21 may be prevented from rotating or moving with respect to the shell 8 as by soldering or pinning the disk 21 to the shell 8.

The locking bolt or member 18 may have a flat surface 27 leaving a raised extension 28 at the outer end of the member 18. The disk 21 has an opening conforming to the circular and straight line or flat contour of the member 18 as indicated in Fig. 6. This irregular shaped opening and the surface 27 on the member 18 prevent the member 18 from rotating but allow it to slide through the disk 21, the projection 28 limiting the outward movement of the member 18 and attached parts.

The ring member 23 is preferably resilient, that is, is a spring, particularly as to its free end 23', Fig. 6, the member 23 being attached either to the disk 21 or to the casing 8, as by soldering, or otherwise, preferably at its other end 23'', Fig. 6, or at a plurality of suitable points, thus preventing the rotation of the member 23 circumferentially in its grove 24. At its free end 23' the member 23 has an extension 29 projecting across the face of the disk 21 and adapted to enter the notch 30 formed at the outer end of the stud 16.

The operation is as follows: The parts in their normal unlocked position are shown in Fig. 5. If it is desired to lock the steering gear, or any other parts, the holes 19 and 20 are brought into alinement with each other, which may mean any desired position of the parts 1 and 2 with respect to each other, as for example, such position as sets the vehicle wheels to turn the vehicle in a circle, or in position for steering straight ahead. With the holes 19 and 20 in alinement the parts may be locked by simply pushing in on the head 11 thus compressing the spring 25, the outer end 29 of spring member 23 being in the position indicated in Fig. 5 and in the dotted position indicated in Fig. 6. When the head 11 has been pushed sufficiently far, the locking member or bolt 18 has passed into both holes 19 and 20, preventing relative movements of parts 1 and 2, and in reaching such position the end 29 of member 23 snaps into the notch 30, the parts being then in the position indicated in Figs. 2 and 3, the detent member 29 thus preventing spring 25 from moving the locking member 18 and attached parts outwardly. In other words the detent 29 holds the parts in locking position indicated in Figs. 2 and 3 and the full line position indicated in Fig. 6. To unlock the parts, to again allow use of the steering gear or other previously locked parts, the key K is inserted into the tumbler lock and suitably turned, as well understood in the art, and this being the proper key, the barrel 14 and stud 16 are rotated. The rotation of the stud 16 causes the detent 29 to be moved out of the notch 30 to a position similar to that indicated in Fig. 7, and when so out of the notch 30 the spring 25, formerly under compression, expands and pushes the lock bolt 18 etc. outwardly to the position indicated in Fig. 4, the bolt 18 being now withdrawn from the holes in member 22 and the detent 29 having ridden on the outer surface of the member 18 as such member is moved to the left, Fig. 4. With the parts in the position indicated in Fig. 4 the key is not removable from the lock, as well understood in connection with tumbler locks, and the further rotation of the parts to allow withdrawal of the key brings such parts to the relative position indicated in Fig. 5, that is, the barrel 14 and stud 16 have been rotated back to their position indicated in Fig. 3 ready to receive the detent 29 when the parts are again moved to locking position. In the position indicated in Fig. 5 the key K can be entirely removed.

In Fig. 7 M represents the magneto used for ignition of the combustible mixture of an internal combustion engine used for example upon a motor vehicle for automobile. One terminal of the magneto is connected to the ground or frame of the engine or machinery, such ground being indicated at G. The other terminal of the magneto may be connected through conductor 31 with the usual ignition circuits or apparatus. The same terminal of the magneto may also be connected to the switch contact 32 secured upon the disk 21, which in such case is of insulating material. The coöperating movable switch contact 33 may be carried on the end of the detent 29, and the member 29 may be connected to the ground or engine frame G' as indicated. It will be seen that when the detent 29 is in the locking position contact 33 is in engagement with contact 32 thus short circuiting the magneto and preventing starting of the motor or engine. And it will be further seen that until the key K has unlocked the parts the magneto M will continue to be short circuited and prevent operation of the engine or motor.

Where a battery is used for ignition either alone or in conjunction with a magneto, in the latter case usually at starting of the engine or motor, such battery B may have one terminal connected to the conductor 34 of the ignition circuits or apparatus while its other terminal is connected to a switch contact 35 supported upon the insulating disk 21, and coöperating switch contact 33' being carried by and electrically connected with the detent 29. When the parts are in the unlocked position indicated in Fig. 7 this remaining terminal of the battery B is connected to the ground through the contacts 33' and 35, thus rendering the battery effective for ignition purposes. When however all parts are in the locked position with the detent 29 within the notch 30, the contact 33' is removed from engagement with contact 35 thus breaking the battery circuit and preventing ignition by such battery.

While I have here shown the switch mechanism operated by the detent 29, it is to be understood that suitable switching mechanism for like or other purposes may be actuated by the longitudinal movement of the locking bolt 18, or any other suitable part of the mechanism.

What I claim is:

1. The combination with a steering member of a vehicle, of means attached to said member for locking the same comprising a lock and a locking member movable together with respect to said steering member, and a detent for holding said lock and locking member in position for locking said steering member when said lock is in locked position.

2. The combination with a steering member of a vehicle, of means attached thereto for locking the same comprising a lock and a locking member movable with each other with respect to said steering member, said lock comprising a key controlled barrel, and a detent controlled by said barrel for holding said locking member in position for locking said steering member.

3. The combination with relatively rotatable members having apertures, of means for locking said rotatable members attached to one of them and comprising a lock and a locking member movable together with respect to said rotatable members, said locking member adapted to enter said apertures, and a detent for holding said lock and locking member in locking position.

4. The combination with a locking member, of a lock movable therewith, a detent for holding said locking member in predetermined position, and a movable member of said lock controlling said detent.

5. The combination with a lock having a rotatable barrel, of a locking member movable with said lock to locking position, a detent adapted to engage said locking member, said barrel adapted upon its rotation accompanying the unlocking movement of said lock to remove said detent from control of said locking member.

6. The combination with a casing, of a lock and locking member movable together with respect to said casing, a member in said casing preventing rotation of said locking member and limiting movement of said locking member in one direction, said lock having a rotatable barrel controlled by the lock key, and a detent for engaging said locking member controlled by said barrel.

7. The combination with a locking member and a lock movable together, of a detent for restraining said locking member, and a key controlled member of said lock controlling said detent.

8. The combination with a tumbler lock having a rotatable barrel, of a locking member attached to and movable with said lock, a detent controlling said locking member, notches in said barrel and locking member forming a notch to receive said detent, rotation of said lock barrel removing said detent and freeing said locking member.

9. The combination with a cylindrical tumbler lock, of a locking member attached thereto and movable therewith, a detent for restraining said locking member, the rotatable barrel of said tumbler lock disposed eccentrically with respect to said locking member, said barrel in rotating controlling said detent.

10. The combination with a casing, of a detent supported therein, a disk in said casing, a locking member extending through said disk and prevented from rotating thereby, a tumbler lock attached to and movable with said locking member, and the rotatable barrel of said tumbler lock rotatable with respect to said locking member for controlling said detent.

11. The combination with a locking member, of a detent for restraining the same in a given position, and a lock mechanism movable with said locking member and restrained by said detent and comprising a key controlled rotatable member, said rotatable member controlling said detent.

12. The combination with a locking member, of a detent for restraining the same in a given position, a lock mechanism comprising a key controlled rotatable member, said rotatable member controlling said detent, and a member carrying said lock mechanism and said locking member and with respect to which they are both movable together.

13. The combination with a locking member, of a shell thereon, a lock mechanism disposed within said shell and movable with said locking member, and a spring opposing movement of said lock and said locking member.

14. The combination with a body to be locked to a second body, of a locking bolt carried by said first body and adapted to engage said second body, and a lock carried by said first body and movable with respect thereto with said locking bolt.

15. The combination with a locking member, of a shell thereon, a lock having a shell inclosure received in said first named shell, and a casing with respect to which said locking member and said lock move together.

16. The combination with a locking member, of a shell thereon, a lock having a shell inclosure received in said first named shell, a casing with respect to which said locking member and said lock move together, and a spring within said casing opposing movement of said lock and said locking member.

17. The combination with a tumbler lock having a head and a shell, of a locking member, a hollow member thereon receiving said shell, a casing attached to said head, and a second casing with respect to which said locking member and said lock move together.

18. The combination with a tumbler lock having a head and a shell, of a locking member, a hollow member thereon receiving said shell, a casing attached to said head, a second casing with respect to which said locking member and said lock move together, and a spring disposed between said casing and said hollow member opposing movement of said lock and said locking member.

19. The combination with a member, of a detent carried thereby, a lock movable with respect to said member and said detent, said detent adapted to restrain said lock, said lock having a key controlled member for actuating said detent to release said lock.

20. The combination with relatively movable members adapted to be locked to each other, of a detent carried by one of said members, a locking member and a lock movable together with respect to said detent carrying member, a spring, said lock and locking member adapted to be manually pressed in opposition to said spring to position to lock said members together, said detent adapted to restrain said lock and locking member in locking position.

21. The combination with relatively movable members adapted to be locked to each other, of a detent carried by one of said members, a locking member and a lock movable together with respect to said detent carrying member, a spring, said lock and locking member adapted to be manually pressed in opposition to said spring to position to lock said members together, said detent adapted to restrain said lock and locking member in locking position, and a key-controlled member of said lock movable independently of said locking member for actuating said detent to release said lock and locking member.

In testimony whereof I have hereunto affixed my signature in the presence of the two subscribing witnesses.

ROBERT P. NICHOLS.

Witnesses:
ALICE S. MARSH,
NELLIE EVANS.